L. C. GORHAM.
CUTTER.
APPLICATION FILED AUG. 6, 1917.
1,258,891. Patented Mar. 12, 1918.
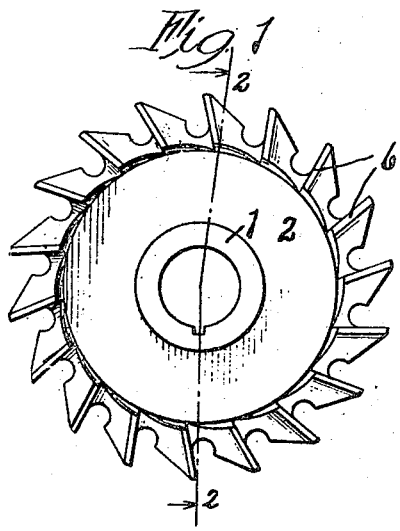
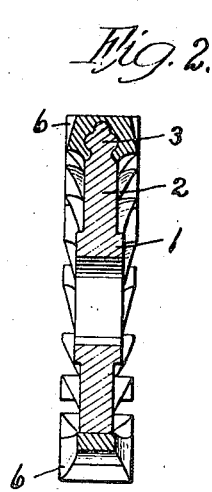
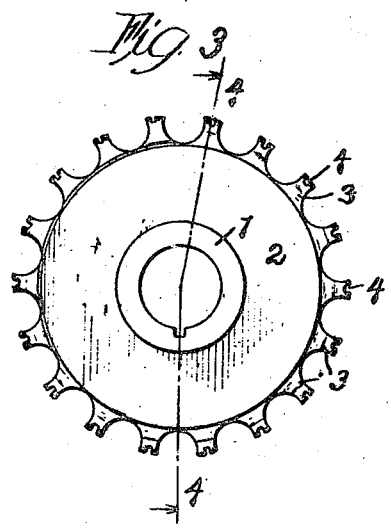
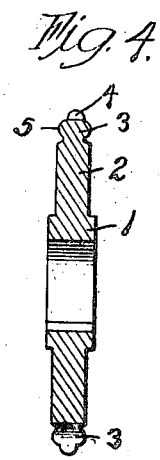
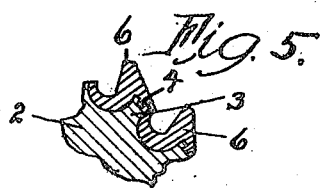
Inventor
Lewis Clayton Gorham

UNITED STATES PATENT OFFICE.

LEWIS CLAYTON GORHAM, OF DETROIT, MICHIGAN.

CUTTER.

1,258,891.  Specification of Letters Patent.  Patented Mar. 12, 1918.

Application filed August 6, 1917. Serial No. 184,611.

*To all whom it may concern:*

Be it known that I, LEWIS CLAYTON GORHAM, a citizen of the United States, and residing at Detroit, in the county of Wayne and State of Michigan, have invented a new and Improved Cutter, of which the following is a specification.

This invention relates to metal cutting tools, particularly to cylindrical milling cutters and reamers, and its object is to provide a tool of this character having a central portion of comparatively cheap, tough metal and a cutting rim of "high-speed" steel or other cutting metals which two metals shall be joined in such a manner that they will act as a unit, even though the cutting rim should crack.

This invention consists of a ring of "high-speed" steel or other cutting metal machined to form cutting teeth, and a central disk of strong tough metal, preferably low-carbon steel which is formed with radial fingers that extend into the cutting teeth. It further consists in forming the fingers with lateral extensions of an interlocking nature to prevent any teeth from becoming displaced from any cause except absolute breakage.

In the accompanying drawing, Figure 1 is a side view of a milling cutter embodying this invention. Fig. 2 is a section on the line 2—2 of Fig. 1. Fig. 3 is a side view of the soft metal center of this cutter. Fig. 4 is a section on the line 4—4 of Fig. 3. Fig. 5 is a section parallel to Fig. 1 of a cutting tooth.

Similar reference characters refer to like parts throughout the several views.

The cost of low carbon steel is but a small fraction of the cost of the so-called "high-speed" tool steels or other cutting metal which may be run at very high speeds while cutting metals. It has been found that the stresses on the cutting teeth of circular cutters can easily be transmitted from the arbor to the teeth by means of comparatively small projections on circular centers. It has also been found that "high-speed" steels and other cutting metals may be cast in the form of rings or in the form of rings of teeth around circular centers and that even more intimate unions between the metals may be formed if proper projections are provided on the circular centers. Because of the ease with which the low carbon steel can be machined, the labor cost of a milling cutter of this description is about one half that of a cutter made entirely of "high-speed" steel or other cutting metal.

While the shape and dimensions of each cutter or reamer (which is a cutter adapted to finish round holes already drilled) will vary with practically every tool, the same general idea will be embodied in each. It will be understood that the mold and the method of casting the cutting metal forms no part of the present invention.

In the drawings the low-carbon steel center is shown formed with a proper hub 1 and web 2. Radially extending from the web are a series of fingers, 3, which may be formed with transverse slots 4 and with lateral ribs 5 of any desired shape, size and number. This center is placed in the mold and the melted cutting metal is poured around it to form a ring which may be blank so that all the metal excepting the finished cutting teeth must be cut away, or the ring may be one of nearly finished cutting teeth 6 such as shown in Fig. 1.

In either case, the fingers 3 must be properly positioned in the mold so that they will extend up into the teeth 6, the metal of which will shrink or fuse around these fingers and firmly unite therewith. Because of the ribs or projections on the sides of the fingers, the teeth will not separate from the fingers even should the ring of cutting metal crack as it may along the inner edge of the rim. The teeth 6 are properly machined, tempered and ground in the usual manner, the ring and the center remaining united during all subsequent heat treatments.

I claim:—

1. A circular cutter comprising two members, one being a circular center of strong tough metal and the other a circumferential ring of teeth of cutting metal, one of said members being formed with an extension in the radial line of each tooth which extensions are embedded in the metal of the other member.

2. A circular cutter comprising a circular center of strong tough metal and a circumferential ring of teeth of cutting metal, the center being formed with a series of fingers of which one extends into each cutting tooth.

3. A circular cutter comprising a circular center of strong tough metal and a circumferential ring of teeth of cutting metal, the center being formed with a series of fingers of which one extends into each cutting tooth, said fingers being formed with lateral projections around which the metal of the teeth is locked.

4. A circular cutter comprising a circular center of strong tough metal and a circumferential ring of teeth of cutting metal, the center being formed with a series of fingers extending into said cutting teeth.

LEWIS CLAYTON GORHAM.